(12) United States Patent
Wagner et al.

(10) Patent No.: US 11,822,303 B2
(45) Date of Patent: Nov. 21, 2023

(54) ELECTRONIC DEVICE AND COMMUNICATION UNIT

(71) Applicant: WAGO Verwaltungsgesellschaft mbH, Minden (DE)

(72) Inventors: Stefan Wagner, Hille (DE); Philipp Neugebauer, Bueckeburg (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 443 days.

(21) Appl. No.: 16/829,552

(22) Filed: Mar. 25, 2020

(65) Prior Publication Data

US 2020/0310374 A1 Oct. 1, 2020

(30) Foreign Application Priority Data

Mar. 27, 2019 (DE) ..................... 20 2019 101 746.5

(51) Int. Cl.
*G05B 19/042* (2006.01)
*H02H 3/08* (2006.01)
*H02J 9/06* (2006.01)

(52) U.S. Cl.
CPC .. *G05B 19/042* (2013.01); *G05B 2219/15097* (2013.01); *G05B 2219/25425* (2013.01); *H02H 3/08* (2013.01); *H02J 9/06* (2013.01)

(58) Field of Classification Search
CPC ........ G05B 19/042; G05B 2219/15097; G05B 2219/25425; H02H 3/08; H02J 9/06

(Continued)

(56) References Cited

U.S. PATENT DOCUMENTS 6,445,086 B1 * 9/2002 Houston ............... H01M 10/46
307/66
6,650,030 B2 * 11/2003 Has ......................... H04L 12/10
307/140

(Continued)

FOREIGN PATENT DOCUMENTS

CN 107064669 A 8/2017
DE 10 2013 107 015 A1 7/2014
DE 19702562 B4 * 5/2015 .......... H04M 11/007

OTHER PUBLICATIONS

Chinese Office Action dated Apr. 26, 2023 in corresponding application 202010213249.6.

*Primary Examiner* — Yemane Mehari
(74) *Attorney, Agent, or Firm* — Muncy, Geissler, Olds & Lowe, P.C.

(57) ABSTRACT

A power supply device for the electrical power supply of electrical components from a power source, wherein the power supply device has at least one communication unit by which the power supply device is designed for data communication with an external computer device, wherein the power supply device has connections for supplying the electrical power for the power supply of the electrical components, wherein the power supply device has at least one controllable digital or analog output connection and/or at least one digital or analog input connection as a further connection, wherein in the case of a controllable digital or analog output connection, this can be controlled by the external computer device via the communication unit and in the case of a digital or analog input connection an input value can be read from this input connection via the communication unit by the external computer device.

11 Claims, 2 Drawing Sheets

(58) Field of Classification Search
USPC ........................................................ 700/298
See application file for complete search history.

(56) References Cited

U.S. PATENT DOCUMENTS

| | | | |
|---|---|---|---|
| 2010/0188785 A1* | 7/2010 | Gascuel | ................. H02H 3/033 361/18 |
| 2011/0167179 A1 | 7/2011 | Feyk et al. | |
| 2011/0208440 A1 | 8/2011 | Pechstein et al. | |
| 2012/0254377 A1* | 10/2012 | Bernhard | ............ H04L 12/4625 709/220 |
| 2014/0098842 A1 | 4/2014 | White, III et al. | |
| 2015/0149821 A1* | 5/2015 | Allahut | ............... G06F 11/2015 714/14 |
| 2015/0273610 A1 | 10/2015 | Denis et al. | |
| 2016/0204613 A1* | 7/2016 | Calvin | .................. G05B 15/02 700/295 |
| 2018/0128437 A1 | 5/2018 | Coombes et al. | |

* cited by examiner

ELECTRONIC DEVICE AND COMMUNICATION UNIT

This nonprovisional application claims priority under 35 U.S.C. § 119(a) to German Patent Application No. 20 2019 101 746.5, which was filed in Germany on Mar. 27, 2019, and which is herein incorporated by reference.

BACKGROUND OF THE INVENTION

Field of the Invention

The present invention relates to an electronic device. The electronic device can be, e.g., an electrical power supply device for supplying electrical power to electrical components from a power source and/or an electronic circuit breaker. The invention relates in particular to the field of electronic devices for industrial systems, in particular for industrial controllers such as, e.g., programmable logic control systems. The invention also relates to a communication unit of an electronic device and an assortment with a plurality of communication modules.

Description of the Background Art

A power supply device is used to provide electrical power at a certain voltage level, e.g., 12 volts or 24 volts, and a certain type of voltage, e.g., direct voltage, wherein the power supply device provides this electrical power supply, e.g., from a power supply network, e.g., an AC voltage network. For this purpose, the electronic device has corresponding components for converting and/or rectifying the electrical power provided by the power supply network, e.g., in the form of a clocked conversion circuit if it is a switched-mode power supply, and/or at least one transformer.

In the industrial power supply sector, high demands are placed on the reliability and functionality of such electronic devices. The invention is based on the object of providing a further improved electronic device.

SUMMARY OF THE INVENTION

It is therefore an object of the present invention to provide an electronic device that has control electronics which have at least one program memory with a computer program stored therein and a computer for executing the computer program. The computer program has software control functions for controlling functions of the electronic device, e.g., power supply functions. In this way, the electronic device can be realized with a large number of functions, each of which can be implemented by software. As a result, the electronic device is also updatable; i.e., an updated computer program can be stored without changing the hardware.

The electronic device can have a parameter memory in which parameters for defining the functionality of the electronic device can be stored. Certain details of the functions of the electronic device can be set by such parameters by the user as needed and adapted to a particular application.

The electronic device can have at least one communication unit which is coupled to the control electronics and by which the electronic device is designed for data communication with an external computer device. In this way, data exchange between the external computer device and the electronic device is possible, e.g., in order to read operating data of the electronic device or to set and/or control certain functions of the electronic device by the external computer device. In addition, it is possible to store variable parameters in the electronic device if it has a parameter memory.

The external computer device can be any computer such as, e.g., a laptop or a PC. The external computer device can also be a control device of a programmable logic control system or another device of such a programmable logic control system. The external computer device can be a device connected to a data bus. For this purpose, the electronic device can be coupled to the data bus via the communication unit.

The communication unit can be designed as an exchangeable communication module, wherein the communication module has a gateway functionality by means of which bidirectional conversion takes place between an external communication protocol, used by the external computer device, and/or physical layer and an internal communication protocol, used between the communication module and the computer, and/or physical layer, wherein the communication module supports either exactly one external communication protocol or multiple external communication protocols. The communication module thus works towards the computer of the electronic device with the internal communication protocol and/or physical layer and towards the external computer device with the external communication protocol and/or physical layer. Due to the gateway functionality, the communication module can perform both a conversion from the external communication protocol into the internal communication protocol and vice versa from the internal communication protocol to the external communication protocol. The same applies to the conversion between the internal physical layer and the external physical layer. The bit transmission layer in the OSI layer model is understood in this case to be the physical layer.

This has the advantage that the communication module and thus its gateway functionality and in particular the supported external communication protocol and/or physical layer can be exchanged in a simple manner by removing a communication module from the electronic device and connecting another communication module to the electronic device. In this way, the electronic device can be adapted with little effort to different external communication protocols and/or physical layers. The internal communication protocol can be, e.g., any fieldbus communication protocol, e.g., Modbus-RTU.

A further advantage of such a modular communication concept is that one and the same communication module can first be used for a specific electronic device and at a later time for another electronic device or some other device. The costs associated with the communication interface are accordingly not allocated to the electronic device or other device but to the communication module.

The external communication protocol can be a bus protocol or a P2P protocol that supports the data communication of multiple external computer devices connected to a common data bus. This has the advantage that the electronic device can be made bus-compatible by the communication module. The external communication protocol can be, e.g., any fieldbus communication protocol, e.g., IO-Link, Ethernet/IP, EtherCAT, Interbus, SafetyBUS p, PROFIBUS, Sercos, Modbus-RTU, and the like.

The communication module can be designed to perform cyclic communications and/or acyclic communications with the computer of the electronic device.

The communication module can be designed to read an identifier, which indicates the device type of the electronic device, from the control electronics of the electronic device via the internal communication protocol and to transmit it to the external computer device via the external communication protocol. This has the advantage that in particular in a data transmission environment with a plurality of communication participants, e.g., when the communication module is connected to a data bus, the electronic device can always identify itself as such an electronic device, regardless of the internal and external communication protocol used. In this way, the electronic device can be identified as such an electronic device by other data transmission participants, regardless of the communication module attached in each case.

The communication module can be designed to convert a command, received via the external communication protocol from the external computer device, for block parameterization of the control electronics into the internal communication protocol, so that the control electronics, in particular their parameter memory, can be described by a plurality of parameters by means of the command for block parameterization. In this way, the new parameter set can be activated collectively. This has the advantage that even when using an internal communication protocol, which does not know any equivalent command per se for block parameterization, the electronic device can be parameterized with such a block parameterization in a "block" by means of the command received via the external communication protocol; i.e., a plurality of parameters can be transmitted quickly and easily with one command and stored in the electronic device.

The communication module can be designed to convert a data storage command, received from the external computer device via the external communication protocol, if necessary in a number of steps, into selected functions of the internal communication protocol, wherein parameter data of the control electronics are read out by the communication module and transmitted to the external computer device and/or parameter data are written from the external computer device to the control electronics via the communication module. In this way, the electronic device can also be made suitable for an externally received data storage command, even if the internal communication protocol does not know such an equivalent command. The received data storage command is then converted by the communication module into existing, selected functions of the internal communication protocol, which can optionally take place in multiple steps, i.e., by a number of internal communication protocol functions which are carried out in succession. By means of the data storage command, a current parameter set of the control electronics of the electronic device can be read out and transmitted to the external computer device, where the parameter set can then be stored. The electronic device can then be re-parameterized, e.g., by transmitting a new parameter set to the control electronics using a block parameterization command. In particular, a backup functionality of a parameter set of the electronic device can be realized via the communication module by the data storage command.

The communication module can have or permits password protection, so that an external computer device, communicating with the electronic device via the communication module, must perform a password authentication at least when certain functions of the control electronics are accessed. In this way, there is increased security against maloperation and in particular against manipulation of the electronic device. This increased security is realized by password protection in the communication module, which prevents any unauthenticated access at least to certain functions of the control electronics. The external computer device must first carry out a password authentication, i.e., transmit a correct password to the communication module, before the communication module releases access to certain functions of the control electronics.

According to an advantageous embodiment of the invention, it is provided that the electronic device is designed as an electrical power supply device for the electrical power supply of electrical components from a power source and/or as an electronic circuit breaker. The electrical power supply device can be designed as a power supply unit, e.g., as a power supply unit of an industrial control system, in particular of a programmable logic controller, as a switched-mode power supply unit, and/or as an uninterruptible power supply (UPS). This has the advantage that the electronic device can be realized in a wide range of variants. In this regard, the same modular communication concept can be used with the exchangeable communication modules. In other words, the communication modules can be used regardless of the type of implementation of the electronic device. In this regard, the identifier that can be read from the control electronics of the electronic device and that specifies the device type of the electronic device can differentiate, for example, between an electronic device of an industrial controller, a switched-mode power supply, and/or an uninterruptible power supply.

The communication module can be plugged from the outside into a housing of the electronic device by means of an electrical plug connection. This allows a simple changing of the communication module as well as a simple attachment of the communication module without tools. The communication module can, for example, have latching elements with which the communication module is latched to the electronic device housing and is fixed in this way to the electronic device housing.

The communication module can have its own control computer that executes a computer program stored in the communication module. An efficient conversion in particular between the external communication protocol and the internal communication protocol can take place in this way, in particular if this requires a certain computing effort and/or memory requirement. The communication module can also be designed without its own control computer, which is advantageous, e.g., if the external communication protocol is identical to the internal communication protocol or deviates only slightly from it. In such cases, for example, the communication module can only have a hardware-based adaptation circuit, e.g., for adapting the physical layer voltage levels.

The electronic device can have a hardware-based detection circuit by means of which the control electronics can detect whether a communication module with its own control computer or a communication module without its own control computer is connected to the electronic device. This has the advantage that the electronic device can automatically determine with little effort which type of communication module is connected to the electronic device. Accordingly, the electronic device can automatically adapt its communication functions to the particular connected communication module. In the case of communication modules without their own control computer, the computer of the electronic device can take over certain control functions of the communication module, such as, e.g., controlling a control input of the communication module for setting the data transmission direction.

The electronic device can be set up for changing the communication module during operation (hot plug). This further increases the flexibility of adapting the electronic device to different requirements. The electronic device can be designed to adapt automatically changed interface parameters of its communication interface to the communication module after the communication module is changed. Adaptation of the communication parameters can also be requested by the newly connected communication module.

The aforementioned object is also achieved by a communication unit of an electronic device of the type described above. Here, the communication unit is designed as an exchangeable communication module, wherein the communication module has a gateway functionality by means of which bidirectional conversion takes place between an external communication protocol, used by the external computer device, and/or physical layer and an internal communication protocol, used between the communication module and the computer, and/or physical layer, wherein the communication module supports either exactly one external communication protocol or multiple external communication protocols. The previously described advantages can also be realized in this way.

The invention also relates to an assortment with a plurality of communication modules of the previously described type, wherein the communication modules of the assortment each have the same internal communication protocol and/or physical layer, but have different external communication protocols and/or physical layers. Electronic devices with a possibility of changing the communication module as needed can be adapted by such an assortment to different external communication protocols and/or physical layers.

The assortment can be supplemented by a communication module which, as an external communication protocol and/or physical layer, has the same communication protocol and/or physical layer as the internal communication protocol and/or physical layer. This communication module can be designed, for example, without its own control computer.

If, for example, the IO-Link protocol is used as the external communication protocol, the communication module can be designed to perform the following functions:

Start Phase:
Parameterizing and initializing IO-Link communication with data read from the electronic device (identification block).

Process Data:
Cyclic Modbus requests, synchronized with IO-Link requests or asynchronously with IO-Link requests.

Parameter Data:
Translating and retranslating from IO-Link to Modbus, for this purpose conversion of IO-Link indices into Modbus addresses by constant offset, mapping of Modbus error messages to IO-Link error messages, forwarding of events to IO-Link master.

Block Parameterization—BP:
The communication module puts electronic device in the BP state if it has received an IO-Link BP start command.

The electronic device does not directly take over written parameter values in the active configuration but stores them temporarily.

Written parameter values become active if the BP stop command is sent and none of the write requests were incorrect during the BP.

The result of the BP is sent to the IO-Link master.

Data Storage—DS
At the request of the IO-Link master, the communication module reads indices from the electronic device (fixedly defined address) and assembles the DS_IndexList, which is made available to the IO-Link master.

The communication module sets electronic device in the BP state (electronic device handles the following requests like block parameterization) when the parameter set is written.

Handling as normal read requests when a parameter set is read.

Providing CRC of the parameter set from the electronic device.

The electronic device has connections for delivering the electrical power for the power supply of the electrical components (consumers). These connections can also be referred to as power supply output connections of the electronic device. According to an advantageous embodiment, the electronic device has at least one controllable digital or analog output connection and/or at least one digital or analog input connection as a further connection. In the case of a controllable digital or analog output connection, this can be controlled by the external computer device via the communication unit. In the case of a digital or analog input connection, an input value can be read from this input connection via the communication unit by the external computer device. This has the advantage that at least one simple remote I/O functionality can additionally be provided via the electronic device. The digital or analog output connection is accordingly an output of such a remote I/O unit, and the digital or analog input connection is an input of such a remote I/O unit. Accordingly, at least simple control and monitoring tasks can be performed with the electronic device, so that in many cases no additional I/O module is required in the system. In this regard, for the realization of the digital or analog input connection and/or the digital or analog output connection, already existing I/O connections of the electronic device can be used, which, for example, are present in any case for certain standard functions such as the display of the correct voltage level ("DC-OK"). Accordingly, the hardware expenditure required for the electronic device is not increased when the aforementioned remote I/O functionality is provided.

Due to this remote I/O functionality, the electronic device can function as a digital remote station that can be used, for example, for status or function monitoring by means of data communication. This remote I/O functionality can be realized by a pure software extension, i.e., by the corresponding code of the computer program. Additional hardware is therefore not required.

If the digital or analog input connection is designed as a digital input connection, only binary input values are provided (0 and 1). If the digital or analog input connection is designed as an analog input connection, input values are provided with a specific value range, for example, with 8 bits (0 to 255) or 12 bits (0 to 4095), depending on the resolution of an analog-to-digital converter used.

If the digital or analog output connection is designed as a digital output connection, only binary output values can be set (0 and 1). If the digital or analog output connection is designed as an analog output connection, output values are provided with a specific value range, for example, with 8 bits (0 to 255) or 12 bits (0 to 4095), depending on the resolution of a digital-to-analog converter used.

The electronic device can have exactly one controllable digital or analog output connection. This minimizes the cost for the remote I/O functionality, especially since a single controllable digital or analog output connection is usually required in any case with such an electronic device.

The electronic device can have exactly one digital or analog input connection. This minimizes the effort for the remote I/O functionality, especially since a single controllable digital or analog input connection is usually required in any case with such an electronic device.

The electronic device can have a parameter memory in which parameters for defining the functionality of the electronic device can be stored, wherein the functionality of the digital or analog input connection can be set by at least one parameter and/or the functionality of the controllable digital or analog output connection can be set. This has the advantage that the functionality of the digital or analog input connection or the digital or analog output connection can be selected by the user and set accordingly. This further increases the flexibility in the use of the electronic device. The functionality of the digital or analog input connection can, for example, be switched between two different functions or a higher number of different functions. The functionality of the digital or analog input connection can, for example, be switched between two functions or a higher number of functions.

The functionality of the digital or analog input connection can be set by means of at least one parameter at least to a fixedly predefined standard input function and/or the functionality of the controllable digital or analog output connection can be set by at least one parameter at least to a fixedly predefined standard output function. This simplifies the selection of the functionality of the digital or analog input connection or the digital or analog output connection for the user.

The standard output function can be the output of a signal at the controllable digital or analog output connection, which indicates whether the voltage of the electronic device, supplied at the connections for supplying the electrical power, is within a permissible range. Accordingly, the digital or analog output connection can be set to a standard function as a "DC-OK" terminal.

The standard input function can be a remotely controllable switching on/off of the electronic device or of the power, supplied at the connections for supplying the electrical power, via the digital or analog input connection. Accordingly, the digital or analog input connection can be used in the standard function as a remote control connection for the electronic device.

The electronic device can have at least one electronic overcurrent circuit breaker that is realized by software by means of the computer program. The electronic device can thus advantageously be expanded by an overcurrent circuit breaker functionality that is at least substantially realized in software. An electronic device with at least one-channel electronic circuit breaker functionality is thus combined within one device. This has the advantage that an external overcurrent circuit breaker can generally be dispensed with. This allows the user to save costs and installation space. In addition, the flexibility for the user is increased. In addition, the external wiring is simplified because no additional wiring effort is required for an external overcurrent circuit breaker.

The electronic overcurrent circuit breaker can be realized solely by the computer program without additional hardware components. Therefore, the hardware already available in any case in the electronic device is used to realize the functionality of the electronic overcurrent circuit breaker. Thus, to be fully functional, the circuit breaker software can only use the hardware that also uses the software for controlling the electronic device or specifically the power supply device as such.

The electronic overcurrent circuit breaker can comprise a function for switching off the output current supplied by the electronic device and/or a function for limiting the output current supplied by the electronic device to a predetermined current value. The switching off in this regard can comprise a permanent switching off of the output current or a temporary (transient) switching off of the output current. The same applies to the limitation of the output current, which can be either permanent or temporary. The function of the electronic overcurrent circuit breaker can also comprise switching between switching off the output current and limiting the output current.

The switching off of the output current supplied by the electronic device or the limitation of the output current supplied by the electronic device can take place by controlling the electronic device on the primary side. For example, the main transformer, e.g., the transformer, can be controlled directly on the primary side. This allows a simple realization of the electronic overcurrent circuit breaker functionality. Thus, the power supply and thereby the supplying of the output current can be stopped or set to a lower level by no longer actively controlling the actual main transformer of the electronic device on the primary side.

To realize the electronic overcurrent circuit breaker functionality, the electronic device can have a current measurement in the output branch. The current measurement can determine whether the output current is too high and the electronic overcurrent circuit breaker must respond accordingly in order to switch off or limit the output current.

The electronic overcurrent circuit breaker can have a monitoring of the output current supplied by the electronic device for exceeding a limit current value, wherein if the limit current value is exceeded, the output current is switched off or the output current is limited to a predetermined current value, e.g., the limit current value. The supplied output current can be determined in this regard via the current measurement mentioned. The computer can compare whether the measured output current exceeds the limit current value. Accordingly, the computer can initiate appropriate countermeasures, such as, e.g., switching off the output current or limiting the output current.

The output current can be switched off or the output current is limited only after a predetermined tripping time during which the output current continuously or predominantly over time exceeds the limit current value. This has the advantage that the electronic overcurrent circuit breaker functionality does not necessarily respond to every small, brief exceeding of the limit current value, but only after the predetermined tripping time.

The electronic device can have a parameter memory in which parameters for defining the functionality of the electronic device can be stored, wherein the electronic overcurrent circuit breaker can be configured by one or more parameters that can be set in the parameter memory as desired by the user. This has the advantage that the circuit breaker functionality can be adapted to the user's needs. In particular, the tripping time and/or the limit current value can be adjustable as parameters. Due to the possibility of setting the tripping time, both "fast-blow" and "slow-blow" circuit breaker characteristics can be set.

The parameters in the parameter memory of the electronic device can be set via the communication unit by means of the external computer device. Setting of the circuit breaker functionality is also possible remotely thereby. In addition, there is an easy way to change the parameters.

The response of the overcurrent circuit breaker, e.g., triggering the limitation and/or switching off of the supplied output current, can be signaled via a light feedback and/or via a communication interface. To this end, already existing light signal displays, e.g., LEDs, can advantageously be used, which indicate the load of the electronic device in normal operation. However, special states, such as, e.g., the circuit breaker functionality, can also be signaled using various blink codes (apart from normal operation). The already mentioned communication unit of the electronic device can be used as the communication interface.

The electronic device can have a logging function in which the activity of the electronic overcurrent circuit breaker functionality is logged. For example, it can be logged when and for how long the electronic overcurrent circuit breaker switches off the output current and/or limits the output current. The log file can be read by an external computer device via the communication unit of the electronic device. This provides the user with improved diagnostic options.

The electronic device can have a housing on which mounting rail fastening elements are arranged, by means of which the electronic device can be fastened to a mounting rail of the electrical installation technology. In this way, the electronic device, like other components of an industrial control system, can be fastened to the mounting rail, for example, lined up next to other devices. The electronic device can, e.g., be snapped onto the mounting rail.

Within the context of the present invention, the indefinite article "a" is not to be understood as a numeral. If therefore, e.g., a component is being discussed, this should be interpreted in the sense of "at least one component." Insofar as angles are given in degrees, they refer to a circular measure of 360 degrees (360°). If a computer is mentioned, it can be designed to execute a computer program, e.g., in the sense of software. The computer can be formed as a commercially available computer, e.g., as a PC, laptop, notebook, tablet, or smartphone, or as a microprocessor, microcontroller, or FPGA, or as a combination of such elements. If regulation is mentioned, regulation differs from control in that regulation has a feedback of measured or internal values, with which the generated output values of the regulation are in turn influenced in the sense of a closed control loop. In the case of control, a variable is controlled purely without such feedback.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
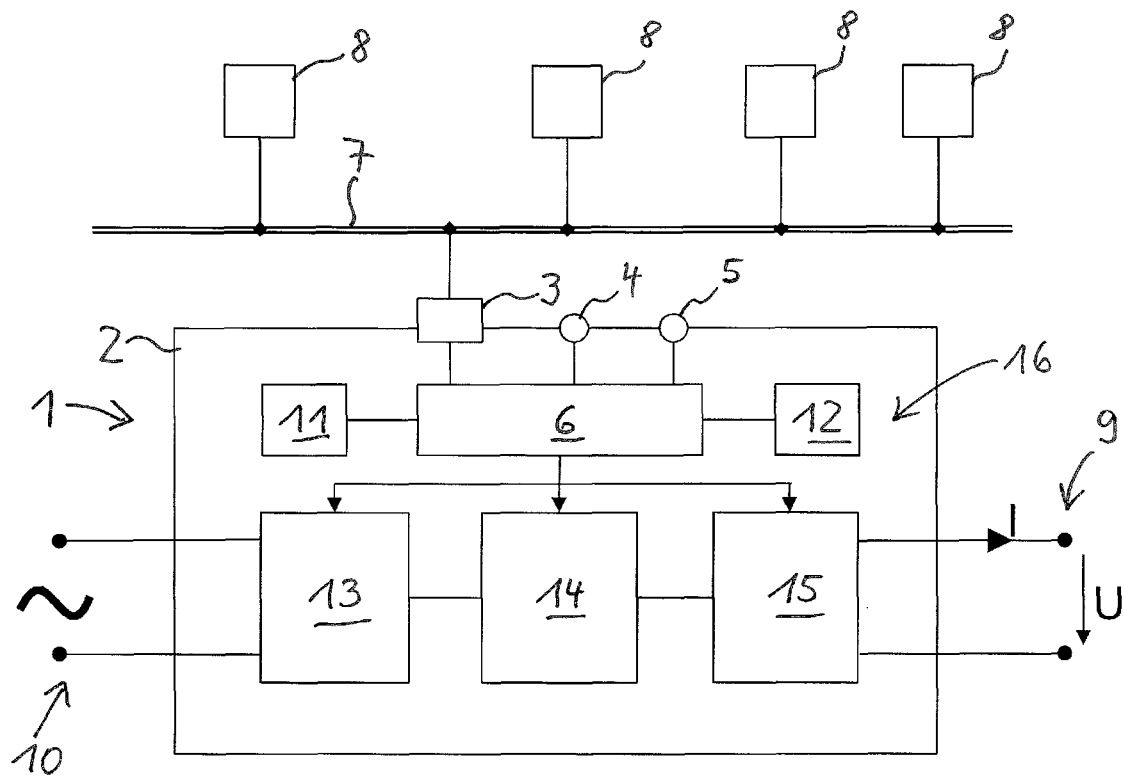
FIG. 1 shows an electronic device in a schematic diagram.

FIG. 1 shows an electronic device 1 that has a housing 2. Control electronics 16 of electronic device 1 are arranged in housing 2. Power electronics components 13, 14, 15 are also located in housing 2. The electronic device has input connections 10 with which electronic device 1 is to be connected to a power supply network, e.g., an AC voltage network. Electronic device 1 is used to convert the electrical power, received by the power supply network via input connections 10, into electrical power which is supplied on the output side and is provided at power supply output connections 9. For example, an output current I with an output voltage U, for example, a DC voltage, can be provided at the power supply output connections 9.

Power electronics components 13, 14, 15 can comprise primary-side components 13 and secondary-side components 15. There may also be a transformer 14 between primary-side components 13 and secondary-side components 15.

Control electronics 16 has a computer 6, a program memory 11, and a parameter memory 12. Computer 6 is connected to program memory 11 and parameter memory 12. A computer program is stored in program memory 11. The computer program has software control functions for controlling the power supply functions of electronic device 1, for example, regulating functions for keeping the output voltage U and/or the output current I constant. Parameters for the user-specific definition of the functionality of the electronic device are stored in parameter memory 12, e.g., in order to select different options or sub-functions in the software control functions. Computer 6 executes the computer program and in so doing takes into account corresponding parameters from parameter memory 12. In this regard, computer 6 controls power electronics components 13, 14, 15 such that a desired output current I and/or a desired output voltage U are provided at power supply output connections 9.

The computer executes an electronic overcurrent circuit breaker functionality and/or a remote I/O function via additional software functions available in the computer program, as explained at the beginning.

With regard to the remote I/O function, computer 6 is connected to additional connections of the electronic device which comprise at least one controllable digital or analog output connection 4 and at least one digital or analog input connection 5. Computer 6 can read in an input signal, e.g., a digital value or an analog value, via digital or analog input connection 5. Computer 6 can output a digital or analog output signal at output connection 4. In this regard, connections 4, 5 do not need to be directly connected to computer 6 but can be decoupled therefrom via suitable interface circuits.

Computer 6 is also connected to a communication unit 3. Computer 6 and thereby electronic device 1 can carry out data communication with external computer devices 8 via communication unit 3. In the exemplary embodiment shown, computer devices 8 are connected to a data bus 7. Electronic device 1 is also connected to data bus 7 via its communication unit 3. In this way, data communication between electronic device 1 and external computer devices 8 can take place.

In the case of the remote I/O functionality, an external computer device 8 can control digital or analog output connection 4 via communication unit 3. In this regard, computer 6 receives a control command from external computer device 8 via communication unit 3 and controls digital or analog output connection 4 in accordance with the control command. An external computer device 8 can read an input value from digital or analog input connection 5 via communication unit 3. In this regard, computer 6 receives a read command from external computer device 8 via communication unit 3, reads the input value from digital or analog input connection 5, and transmits the input value to external computer device 8 by means of a response message via communication unit 3. In addition, the functionality of digital or analog output connection 4 and/or digital or analog input connection 5 can be set via parameters stored in parameter memory 12.

Figure 2:
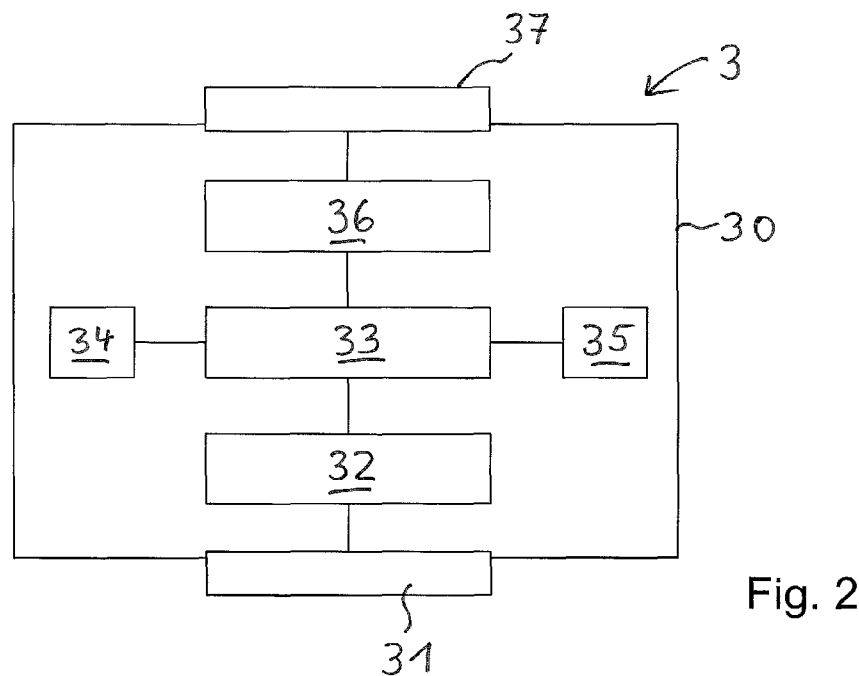
FIG. 2 shows a communication module in a schematic diagram.

Communication unit 3 shown in FIG. 1 can be designed as an exchangeable communication module 30, e.g., as shown in FIG. 2. Communication module 30 has an electrical plug connection 31 with which communication module 30 can be electrically connected to electronic device 1 and in particular to its control electronics 16. Communication module 30 has a further electrical plug connection 37 with which communication module 30 can be connected directly or indirectly to an external computer device 8, e.g., via data bus 7.

A separate control computer 33 can be present in communication module 30. In this case, it is advantageous if communication module 30 has its own program memory 34 and possibly also its own parameter memory 35, wherein these memories are each connected to control computer 33, so that control computer 33 can access the memory contents.

Communication module 30 has a gateway functionality by means of which bidirectional conversion takes place between an external communication protocol, used by external computer device 8, and/or physical layer and an internal communication protocol, used between communication module 30 and computer 6, and/or physical layer. This bidirectional conversion is substantially carried out and controlled by control computer 33. For this purpose, control computer 33 is connected, on the one hand, to plug connection 31, e.g., via an internal hardware interface 32, and, on the other hand, to the further plug connection 37, e.g., via an external hardware interface 36. A hardware-based signal adaptation between control computer 33 and the internal physical layer used can take place via internal hardware interface 32. A hardware-based signal adaptation between control computer 33 and the external physical layer used can take place via external hardware interface 36.

The structure of communication module 30 explained with reference to FIG. 2 is particularly advantageous when the internal communication protocol and the external communication protocol differ significantly and the gateway functionality is so complex that a separate control computer 33 is required. If the differences between the internal and external communication protocol are not so great or even the same communication protocols are used, communication module 30 can also be designed without its own control computer 33. In this case, program memory 34 and parameter memory 35 can also be omitted. If necessary, internal hardware interface 32 can be dispensed with, or it can be implemented in combination with external hardware interface 36.

Figure 3:
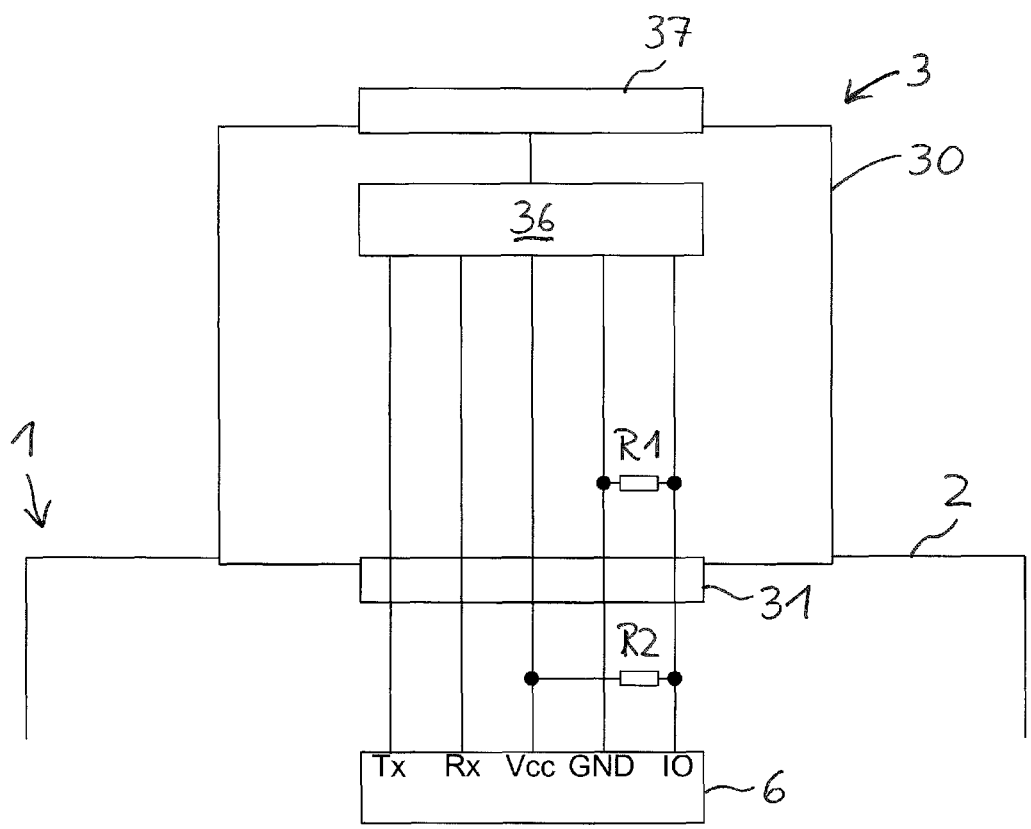
FIG. 3 shows an arrangement of an electronic device and a communication module in a schematic diagram.

FIG. 3 shows such an embodiment of a communication module 30 in connection with a detail diagram of electronic device 1. In this case, communication module 30 is designed without its own control computer. Communication module 30 then substantially only has external hardware interface 36. Depending on the embodiment, it can be that certain control functions of external hardware interface 36 still need to occur under processor control, which is not possible there in the absence of a separate control computer in communication module 30. In this regard, an advantageous embodiment is described with reference to FIG. 3, in which this processor-controlled activation of external hardware interface 36 can take place via computer 6 of electronic device 1.

An interface connection between computer 6 and external hardware interface 36 is shown, which can be designed, e.g., in the form of a serial interface with a transmission line Tx and a receiving line Rx. Electrical power supply lines Vcc (operating voltage for hardware interface 36) and GND (ground line) are also shown. An I/O port of computer 6 is also shown that can be operated both as an output connection and as an input connection. If the I/O port is operated as an output connection, computer 6 can hereby control a control connection of external hardware interface 36, e.g., in order to set the send/receive data transmission direction. If the I/O port is operated as an input connection, thus a digital or analog signal can be read in via this port.

FIG. 3 shows a hardware-based detection circuit by means of which control electronics 16 or computer 6 can detect whether a communication module 30 with its own control computer 33 or a communication module 30 without its own control computer 33 is connected to electronic device 1. In this way, computer 6 can automatically determine whether or not it needs to carry out the control functions via the output signals of the I/O port.

In this case, the hardware-based detection circuit has a resistor R2 which is installed in electronic device 1 and which establishes a connection between Vcc and the I/O port (pull-up resistor). A further resistor R1, which establishes a connection between GND and the I/O port (pull-down resistor), is present in communication module 30. Computer 6 can detect from a voltage level, which is read in via the I/O port and which is established on the basis of the resistance ratio R1/R2, that a communication module 30 without its own control computer is connected. A corresponding communication module 30 with its own control computer would be designed without such a resistor R1, so that a different voltage level then arises at the I/O port, which computer 6 can also detect.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical power supply device for an electrical power supply of electrical components from a power source, the power supply device comprising:
   a housing;
   a computer provided inside the housing;
   at least one communication unit via which the power supply device is designed for data communication with an external computer device;
   wherein the housing further includes:
      connections for supplying the electrical power for the power supply of the electrical components; and
      at least one controllable digital or analog output connection and/or at least one digital or analog input connection as a further connection, wherein the controllable digital or analog output connection is adapted to be controlled by the external computer device via the communication unit and an input value from the digital or analog input connection is adapted to be read by the external computer device via the communication unit, such that neither the controllable digital or analog output connection nor the digital or analog input connection directly communicate with the external computer device, and wherein the at least one controllable digital or analog output connection and the at least one digital or analog input connection are separate from the at least one communication unit.

2. The power supply device according to claim 1, wherein the power supply device has exactly one controllable digital or analog output connection.

3. The power supply device according to claim 1, wherein the power supply device has exactly one digital or analog input connection.

4. The power supply device according to claim 1, wherein the power supply device has a parameter memory in which parameters for defining a functionality of the power supply device are stored, and wherein a functionality of the digital or analog input connection is set by at least one parameter and/or a functionality of the controllable digital or analog output connection is set.

5. An electrical power supply device for an electrical power supply of electrical components from a power source, the power supply device comprising:
at least one communication unit via which the power supply device is designed for data communication with an external computer device;
connections for supplying the electrical power for the power supply of the electrical components;
at least one controllable digital or analog output connection and/or at least one digital or analog input connection as a further connection, wherein the controllable digital or analog output connection is adapted to be controlled by the external computer device via the communication unit and an input value from the digital or analog input connection is adapted to be read by the external computer device via the communication unit, wherein the power supply device has a parameter memory in which parameters for defining a functionality of the power supply device are stored, and wherein a functionality of the digital or analog input connection is set by at least one parameter and/or a functionality of the controllable digital or analog output connection is set, and
wherein the functionality of the digital or analog input connection is set via at least one parameter at least to a fixedly predefined standard input function and/or the functionality of the controllable digital or analog output connection is set by at least one parameter at least to a fixedly predefined standard output function.

6. The power supply device according to claim 5, wherein the standard output function is the output of a signal at the controllable digital or analog output connection, which indicates whether the voltage of the power supply device, which is supplied at the connections for supplying the electrical power, is within a permissible range.

7. The power supply device according to claim 5, wherein the standard input function is a remotely controllable switching on/off of the power supply device or of the power, supplied at the connections for supplying the electrical power, via the digital or analog input connection.

8. The power supply device according to claim 1, wherein the communication unit is designed as an exchangeable communication module, which is adapted to be plugged into the power supply device via an electrical plug connection.

9. The power supply device according to claim 1, wherein the electrical power supply device is designed as a power supply unit, a power supply unit of an industrial controller, a power supply unit of a programmable logic control system, as a switched-mode power supply unit, and/or as an uninterruptible power supply.

10. The power supply device according to claim 1, wherein the at least one communication unit is attachable to the housing.

11. An electrical power supply device for an electrical power supply of electrical components from a power source, the power supply device comprising:
at least one communication unit via which the power supply device is designed for data communication with an external computer device;
connections for supplying the electrical power for the power supply of the electrical components;
a remote I/O unit though which a remote I/O functionality of the electrical power supply device is provided, whereby the power supply device acts as a digital external station;
as a further connection, at least one controllable digital or analog output connection, which is an output of the remote I/O unit, and/or at least one digital or analog input connection which is an input of the remote I/O unit, wherein the controllable digital or analog output connection is adapted to be controlled by the external computer device via the communication unit and an input value from the digital or analog input connection is adapted to be read by the external computer device via the communication unit, such that neither the controllable digital or analog output connection nor the digital or analog input connection directly communicate with the external computer device,
wherein the at least one controllable digital or analog output connection and the at least one digital or analog input connection are part of the electrical power supply device and are separate from the at least one communication unit.

* * * * *